United States Patent Office 3,523,131
Patented Aug. 4, 1970

3,523,131
PROCESS FOR THE PRODUCTION OF METHYL PHENYL TRISILOXANES
Siegfried Sliwinski, Bergbahnstrasse 5,
Dresden, Germany
No Drawing. Continuation-in-part of applications Ser. No. 443,069 and Ser. No. 443,164, Mar. 26, 1965. This application Oct. 15, 1968, Ser. No. 767,816
Int. Cl. C07f 7/08
U.S. Cl. 260—448.2          4 Claims

ABSTRACT OF THE DISCLOSURE

Process for producing 1,3,3,5-tetramethyl-1,1,5,5-tetraphenyl-trisiloxane, 1,3,5 - trimethyl-1,1,3,5,5-pentaphenyl-trisiloxane and 1,5-dimethyl-1,1,3,3,5,5-hexaphenyl trisiloxane, which comprises reacting sodium diphenyl methyl silanolate, obtained by reaction of methyl diphenyl silane with sodium hydroxide in a solution of toluene in the presence of a lower alkyl alcohol, after distilling off azeotropically toluene and traces of water from this solution, directly with dimethyl dichlorosilane, methyl phenyl dichlorosilane or with diphenyl dichlorosilane, respectively, thereby obtaining the compounds

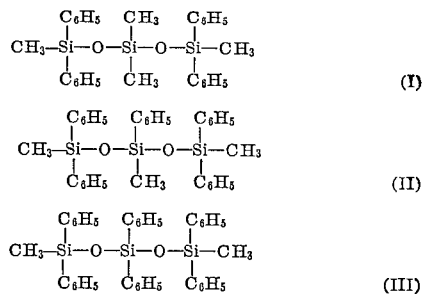

CROSS-REFERENCE TO RELATED APPLICATIONS

This application is a continuation-in-part of my prior applications Ser. No. 443,069 and Ser. No. 443,164, both filed Mar. 26, 1965, both applications now abandoned.

BACKGROUND OF THE INVENTION

The present invention is concerned with a process for the production of 1,3,3,5-tetramethyl-1,1,5,5-tetraphenyl trisiloxane, 1,3,5 - trimethyl-1,1,3,5,5-pentaphenyl trisiloxane of 1,5-dimethyl-1,1,3,3,5,5-hexaphenyl trisiloxane.

It is known that 1,3,3,5-tetramethyl-1,1,5,5-tetraphenyl trisiloxane can be obtained by reacting methyl diphenyl silanol with dimethyl dichlorosilane in the presence of pyridine as hydrogen chloride acceptor in toluene solution according to the equation:

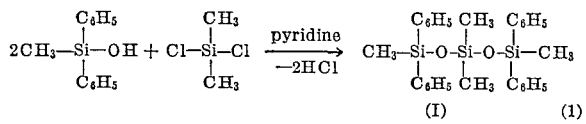

In the same way there can be obtained 1,3,5-trimethyl-1,1,3,5,5-pentaphenyl trisiloxane by reacting methyl diphenyl silanol with methyl phenyl dichlorosilane in toluene solution, according to the equation:

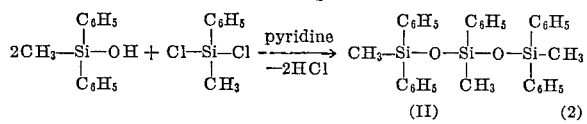

The yield for compound (I) is 57% of theory, referred to the methyl diphenyl silanol, while for the compound (II) the yield is uncertain (see U.S. Pat. 2,890,234).

Moreover, it is shown in U.S. Pat. 2,890,234 that the reaction of sodium methyl diphenyl silanolate with the corresponding dichlorosilanes gives comparatively poor yields of the desired trisiloxanes, such reaction being, for example, in accordance with the equations:

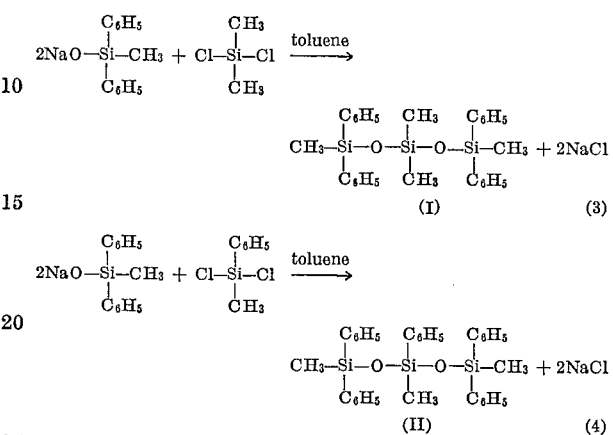

DESCRIPTION OF THE INVENTION

It has now been found that, in contrast to the teachings of the prior art, the processes of Equations 3 and 4 can be carried out so as to obtain very good yields of the compounds (I) and (II), by reacting an azeotropically dehydrated solution of the sodium methyl diphenyl silanolate in toluene with the corresponding dichlorosilane. A precise and complete azeotropic dehydration is therefore of great importance, since only under such conditions can the desired high yields of trisiloxanes be obtained.

The sodium methyl diphenyl silanolate solution can readily be obtained in accordance with the equation:

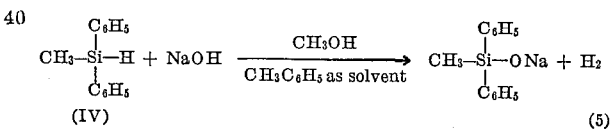

The methyl diphenyl silane and NaOH are employed in approximately equimolar amounts.

The diphenyl methyl silane itself (IV) can be obtained in a yield of about 85% of theory (based upon methyl dichlorosilane) in accordance with the reaction of the equation:

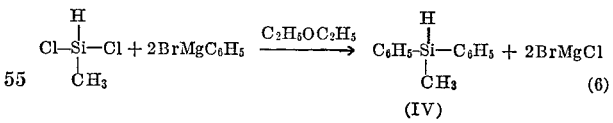

In accordance with another aspect of the invention, it was found that the reaction of the invention can also be utilized to prepare the hitherto unknown compound 1,5-dimethyl-1,1,3,3,5,5-hexaphenyl trisiloxane (III), having the formula:

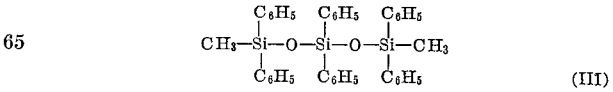

by the reaction of sodium methyl diphenyl silanolate with diphenylchlorosilane. The preparation of this new compound and its properties are disclosed more fully in Example 4 below.

In accordance with the foregoing reactions, the compound 1,3,3,5-tetramethyl-1,1,5,5-tetraphenyl trisiloxane is obtained by the process of the equation:

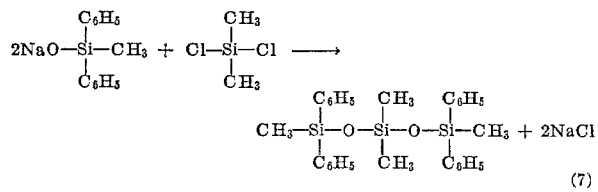

(7)

in yields equally as high as by the known reaction of methyl diphenyl silanol with dimethyldichlorosilane in the presence of pyridine as hydrogen chloride acceptor, wherein the yield is over 85% of theory, referred to the methyl diphenyl silanol, according to U.S. Pat. 2,890,234. the methyl diphenyl silane is readily obtained from methyl dichlorosilane and phenyl magnesium bromide in ethereal solution in high yields (80% referred to the dichlorosilane). The methyl diphenyl silane is reacted in dilute toluene solution with 96% sodium hydroxide in the presence of methanol to give the corresponding methyl diphenyl silanolate, the methanol and traces of water being removed by azeotropic distillation. The toluene is then distilled off until it exhibits a constant boiling point.

The sodium methyl diphenyl silanolate is then reacted with dimethyl dichlorosilane according to Equation 7. Instead of methanol, other lower alkyl alcohols such as ethanol, propanol or butanol, may be employed.

It has also been found, in accordance with the invention, that the solution of sodium methyl diphenyl silanolate can be reacted with methyl phenyl dichlorosilane to give, in good yields, the compound 1,3,5-trimethyl-1,1,3,5,5-pentaphenyl trisiloxane. The reaction, which takes place in toluene solution, can be represented by the equation:

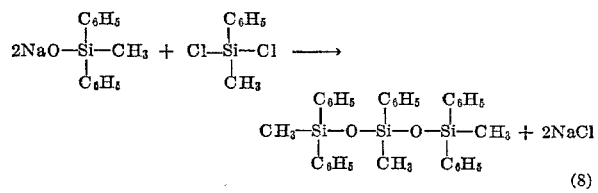

(8)

The reaction mixture can be worked up by adding water to dissolve the sodium chloride formed, separating the toluene layer, roughly distilling off the bulk of the toluene, followed by a coarse vacuum distillation to remove traces of toluene, and then subjecting the residue to a fine vacuum distillation to obtain the desired trisiloxane. The reaction temperature will advantageously be in the range of about 20° to 45° C. for this and the other trisiloxane forming reactions.

A slight excess of about 5% of silanolate is necessary, in order to obtain an optimum yield of trisiloxanes (molar ratio of silanolate to diorgano-dichlorosilane about 2.1 to 1).

The processes of the invention possess a number of important advantages in comparison with those of the prior art, and particularly the methods of U.S. Pat. 2,890,234, and provide a significant improvement and simplification in the art. Among these advantages are:

(1) The reaction of methyl dichlorosilane with phenyl magnesium bromide forms diphenylmethyl silane very specifically when the molar ratio of methyl dichlorosilane to phenyl magnesium bromide is maintained at about 1 to 2.5. Diphenyl is produced as an impurity from the Grignard reagent to the extent of about 5%, but this has no effect upon the further processing. In any event, this reaction does not produce any mixture of methyl diphenyl silanes which would present a major separation problem.

(2) The reaction of diphenyl methyl silane with caustic soda (NaOH) in toluene solution leads directly to the sodium methyl diphenyl silanolate, thus avoiding its isolation as an anhydrous compound, which is very difficult. Instead, the toluene solution of the sodium methyl diphenyl silanolate thus prepared is azeotropically dehydrated, and then immediately converted by reaction with the corresponding dichlorosilane to the desired trisiloxane, thus enabling much higher yields of these trisiloxanes to be obtained than was the case with heretofore known methods.

(3) The high yields made possible in accordance with the methods of the present invention for the desired trisiloxanes also permit the omission of the separation of diphenyl methyl silanol, which can only be obtained using several reaction stages with repeated fractional distillation, as well as its conversion with the diorganodichlorosilanes in the presence of the poisonous pyridine, which itself requires special health protection measures. Moreover, the use of pyridine as an HCl acceptor leads to voluminous precipitates of pyridine hydrochloride in the viscous reaction mixtures, and such precipitates can only be separated with great difficulty, offering many problems. The problem of the destruction or conversion of such precipitates does not arise in connection with the novel method of the present invention.

(4) Inexpensive reagents such as caustic soda (NaOH) and methanol are employed in the method of the present invention, and these are readily available in connection with the direct synthesis of such materials as hydrogen methyl dichlorosilane, thus permitting considerable economies in operation and further pointing up the process improvement over prior art methods.

DESCRIPTION OF THE PREFERRED EMBODIMENTS

The practice of the invention will be better understood by reference to the following examples, which represent present preferred embodiments, but which are not to be regarded as limiting:

EXAMPLE 1

Process for producing the azeotropically distilled solution of sodium diphenyl methyl silanolate in toluene A vessel with 10.87 liters of a 2,3-molar ethereal solution of phenyl magnesium bromide (25 mol phenyl magnesium bromide) is placed in a water bath and equipped with a strong stirrer, a feeding vessel and a reflux condenser. While cooling (+11° C.) and, at the same time, while stirring vigorously, a solution of 1150 g. (about 10 mol) methyl dichlorosilane in 6.1 liters ether is added in such manner, that the ether just begins to reflux. The reaction mixture is subsequently further heated for 1.5 hours with refluxing of the ether. After cooling to about 0° C., 19 liters water is added with continuous and vigorous stirring, the addition of the water being initially very slow and later somewhat more rapid, and 740 ml. concentrated hydrochloric acid having first been added to the water. The magnesium chloride bromide and the magnesium hydroxy bromide formed by the decomposition of unreacted magnesium phenyl bromide are dissolved. The ethereal layer is separated from the aqueous phase, treated with kaolin powder, filtered, and the ether distilled off. Residual traces are blown off with nitrogen. The resulting residue, which consists of crude methyl diphenyl silane, is treated with activated charcoal and then distilled at a pressure of 0.5 mm. Hg 1645 g. methyl diphenyl silane, boiling at a constant temperature of 75° C. distills over. The yield is 83% of theory, referred to the methyl dichlorosilane.

5.0 kg. (about 25 mol) of the methyl diphenyl silane is dissolved in 7.25 liter toluene and placed in a 50-liter glass vessel equipped with a stirrer, feeding vessel, reflux condenser and gas exit tube, 1060 g. of approximately 96% granulated sodium hydroxide are introduced into this solution. After the gas exit tube has been connected via a bubble counter with a gas meter, 1100 ml. methanol is allowed to run into the stirred mixture from the feeding vessel in the course of 3–4 hours, the reaction mixture being gradually heated during this period of addition to 60° C. A uniformly vigorous evolution of hydrogen sets in, which, after the formation of about 600 liters of hydrogen, gradually decreases. The sodium hydroxide gradually disappears apart from a small amount which settles on the bottom of the vessel. The solution itself has a milky appearance. There is now distilled off from the reaction mixture in the vessel the residue of methanol which has not been carried away by the hydrogen, as well as small amounts of water, and, finally, toluene in an amount such that a constant boiling point is reached. About 5.5 liters distillate is collected.

The methanol and water containing toluene can, after washing out the methanol, be dried and redistilled.

EXAMPLE 2

Process for producing 1,3,3,5-tetramethyl-1,1,5,5-tetraphenyl-trisiloxane

Into the remaining toluene solution from Example 1, containing the resultant sodium methyl diphenyl silanolate, there is introduced slowly, with stirring, and at a temperature between 20 and 25° C., which must be definitely maintained, a solution of 1.55 kg. (about 12 mol) dimethyl dichlorosilane in 4.5 liters toluene, this addition slowly taking place within a period of about 3–4 hours. Stirring is then continued for a further 15 minutes. The reaction mixture is subsequently washed three times with 5-liter amounts of water containing 1% HCl by weight and the toluene solution, after separation, neutralized with kaolin and dried with anhydrous sodium sulphate. After the rough distillation of about 10 liters toluene (boiling range 90–115° C./1760 mm. Hg), there are obtained a further 2 liters of liquid boiling at 110–210° C./2 mm. Hg which mainly consists of toluene, containing some oligosiloxanes.

The 6 kg. of residue remaining behind are worked up in a vacuum distillation apparatus. 5.15 kg. distill over as the main fraction at 213–216° C. and at a pressure of 0.2–0.3 mm. Hg, the physical and analytical values of which (see following table) indicate that it is 1,3,3,5-tetramethyl-1,1,5,5-tetraphenyl trisiloxane. The yield is 85% of theory, referred to the methyl diphenyl silane.

Tetramethyl tetraphenyl trisiloxane

Density, $d_4^{20}$ _____ 1.067
Viscosity (cst.):
  $v_{20}$ _____ 48.5
  $v_{50}$ _____ 13.2
  $v_{70}$ _____ 7.00
Viscosity temperature coefficient _____ 0.82
Refractive index, $n_D^{20}$ _____ 1.5582
Pour point, ° C _____ −40
Flash point (Marcusson), ° C _____ +230

Molecular weight: Calc'd, 485; found, 480. Calc'd (percent): C, 69.37; H, 6.65; Si, 17.38. Found (percent): C, 69.25; H, 6.50; Si, 16.6.

EXAMPLE 3

Process for producing 1,3,5-trimethyl-1,1,3,5,5-pentaphenyltrisiloxane 5.9 kg. (25 mol) sodium diphenyl methyl silanolate in the form of a 33% by weight solution in toluene (see Example 1), is placed in a 50-liter glass vessel equipped with a strong stirrer, a feeding vessel and a reflux condenser, as well as with a thermometer projecting into the reaction space. The production of the silanolate solution takes place in the manner described in Example 1, the adjustment of the concentration to 33% by weight being achieved by the addition of an appropriate amount of toluene.

A solution of 2.3 kg. (about 12 mol) methyl phenyl dichlorosilane in 5 liters toluene is added from the feeding vessel to the silanolate solution within the course of 5–6 hours, while stirring. Care is to be taken that the temperature in the reaction mixture is maintained between 25 and 30° C. After the completion of the addition of the methyl phenyl dichlorosilane, the reaction mixture is stirred for a further 2–3 hours. 6 liters water is subsequently added rapidly, with stirring, in order to dissolve the sodium chloride formed and which has separated from the reaction mixture. In order to achieve an improved separation of the toluene phase from the aqueous phase, 200 ml. of concentrated hydrochloric acid is added so that the aqueous phase is just acidic. The aqueous phase is thereafter separated from the toluene phase in a separating vessel and the toluene solution stirred with a mixture of about 125 g. each of kaolin powder, pulverized activated charcoal and pulverized sodium sulphate, whereby the toluene solution is deacidified, clarified and dried.

After filtration, the solution obtained containing the crude product is distilled in a simple distillation apparatus at atmospheric pressure. About 9 liters toluene are thereby recovered within the boiling range of 90–130° C. As residue, there remain behind 6.5 kg. of yellow oil which still contains some toluene. By means of a rough vacuum distillation, the last traces of toluene are recovered, together with some diphenyl and small amounts of volatile oligosiloxanes, these have a total weight of about 1.5 kg. and distill off at 40–200° C./1. mm. Hg.

The residue from the rough vacuum distillation is now subjected to a fine vacuum distillation. About 4 kg. of a clear, highly refractive and colorless oil hereby distill over at 245–255° C./0.3–0.5 mm. Hg as the main fraction, which, on the basis of its physical and analytical values, proves to be 1,3,5-trimethyl-1,1,3,5,5-pentaphenyl trisiloxane. The yield is 61% referred to the methyl diphenyl silane.

1,3,5-trimethyl-1,1,3,5,5-pentaphenyl-trisiloxane

Density, $d_4^{20}$ _____ 1.093
Viscosity (cst.) :
  $v_{20}$ _____ 225
  $v_{50}$ _____ 33.0
  $v_{70}$ _____ 13.5
Viscosity temperature coefficient _____ 0.91
Refractive index, $n_d^{20}$ _____ 1.5796
Pour point, ° C _____ −25
Flash point, ° C _____ +266

Molecular weight: Calc'd, 546; found, 550. Calc'd (percent): C, 72.52; H, 6.24; Si, 15.42. Found (percent): C, 72.48; H, 6.26; Si, 15.0.

EXAMPLE 4

Process for preparation of 1,5-dimethyl-1,1,3,3,5,5-hexaphenyl trisiloxane

To 2890 g. of azeotropically dehydrated 33% sodium methyl diphenyl silanolate solution (4.04 mol

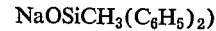

$NaOSiCH_3(C_6H_5)_2)$ prepared according to Example 1 (see also Example 3), there is added dropwise a solution of 506 g. (2 mol) diphenyl dichlorosilane in 1000 ml. toluene within a temperature range of 23°–42° C., during a period of 6½ hours, and the mixture is stirred for another half hour. After cooling the reaction mixture there is added 2.5 liters water and 50 ml. concentrated HCl under rapid stirring, whereby the resulting NaCl is dissolved, and the mixture is stirred for another hour. After separation of the toluene solution and its treatment with a 2:1 mixture (parts by weight) of kaolin and activated carbon powder, and subsequent filtration, there is obtained a pale yellow clear solution in toluene of the crude 1,5-dimethyl-1,1,3,3,5,5-hexaphenyl trisiloxane (III).

After distilling off 2875 ml. toluene at atmospheric pressure there remain 1140 g. of a light yellow clear oil. By means of a simple vacuum distillation at a boiling range of 138°–200° C./1. mm. Hg there is obtained from this 1140 g., about 90 g. of a yellowish distillate. As a residue there remain 1050 g. of a yellow viscous oil. By means of a molecular distillation (according to Utzinger) at $10^{-4}$ to $10^{-5}$ torr. at a channel temperature of about 200° C. there are recovered from 1050 g. of crude oil, 542 g. of the pure 1,5-dimethyl-1,1,3,3,5,5-hexaphenyl trisiloxane (III). This represents a yield of 44%, referred to the sodium methyl diphenyl silanolate used.

The following table contains physical constants as well as analytical values. These confirm the identity of the hexaphenyl trisiloxane.

1,5-dimethyl-1,1,3,3,5,5-hexaphenyltrisiloxane

| | |
|---|---|
| Density, $d_4^{20}$ | 1.112 |
| Viscosity (cst.): | |
| $v_{20}$ | 1550 |
| $v_{50}$ | 95.8 |
| $v_{70}$ | 27.4 |
| Viscosity temperature coefficient | 0.96 |
| Refractive index, $n_D^{20}$ | 1.5957 |
| Pour point, ° C. | −10 |
| Flash point, ° C. | +280 |

Cal'd (percent): C, 75.0; H, 5.90; Si, 13.80. Found (percent): C, 74.4; H, 6.0; Si, 13.8.

What is claimed is:
1. Process for producing methyl phenyl trisiloxanes which comprises the steps of:
   (a) reacting methyl diphenyl silane with sodium hydroxide in equimolar amounts in a solution of toluene in the presence of a lower alkyl alcohol, whereby a toluene solution of sodium methyl diphenyl silanolate is obtained;
   (b) dehydrating said toluene solution by distilling off azeotropically toluene and traces of water from the solution; and
   (c) reacting the sodium methyl diphenyl silanolate in said toluene solution directly with a dilute solution of a diorgano dichlorosilane in toluene thereby obtaining the trisiloxanes.

2. Process according to claim 1, wherein the lower alkyl alcohol and traces of water are distilled off azeotropically from the solution of sodium methyl diphenyl silanolate in toluene until the toluene also distilling off has a constant boiling point before carrying out the reaction with the diorgano dichlorosilane.

3. Process according to claim 1, wherein the solution of sodium methyl diphenyl silanolate in toluene is reacted in step (c) with a dilute solution of dimethyl dichlorosilane thereby obtaining the compound of the formula

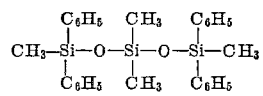

4. Process according to claim 1 wherein the solution of sodium methyl diphenyl silanolate in toluene is reacted in step (c) with a dilute solution of methyl phenyl dichlorosilane in toluene thereby obtaining the compound of the formula

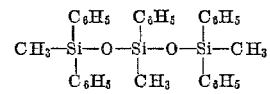

References Cited

UNITED STATES PATENTS

| | | | |
|---|---|---|---|
| 2,410,346 | 10/1946 | Hyde | 260—448.2 X |
| 2,453,092 | 11/1948 | Hyde et al. | 260—448.2 |
| 2,890,234 | 6/1959 | Fletcher et al. | 260—448.2 |
| 3,280,073 | 10/1966 | Chaffee | 260—448.2 X |

OTHER REFERENCES

Eaborn: "Organosilicon Compounds," Academic Press Inc., N.Y. (1960), p. 273.

Benkeser et al.: J.A.C.S., 74, 1952, p. 5316.

HELEN M. McCARTHY, Primary Examiner

P. F. SHAVER, Assistant Examiner